United States Patent
Iimuro et al.

(10) Patent No.: US 10,226,956 B2
(45) Date of Patent: Mar. 12, 2019

(54) AQUEOUS DISPERSION RESIN COMPOSITION, RESIN COMPOSITION FOR A THERMAL RECORDING LAYER, RESIN COMPOSITION FOR A PROTECTION LAYER, AND THERMAL RECORDING MATERIAL

(71) Applicant: MITSUI CHEMICALS, INC., Tokyo (JP)

(72) Inventors: Yoshifumi Iimuro, Ichihara (JP); Toshihiro Yoshimura, Ichihara (JP); Syouta Mizutani, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/310,316

(22) PCT Filed: May 18, 2015

(86) PCT No.: PCT/JP2015/064232
§ 371 (c)(1),
(2) Date: Nov. 10, 2016

(87) PCT Pub. No.: WO2015/178354
PCT Pub. Date: Nov. 26, 2015

(65) Prior Publication Data
US 2017/0151821 A1    Jun. 1, 2017

(30) Foreign Application Priority Data

May 20, 2014  (JP) ................ 2014-103930

(51) Int. Cl.
| B41M 5/337 | (2006.01) |
| C08F 265/08 | (2006.01) |
| C08F 265/10 | (2006.01) |
| C08L 33/14 | (2006.01) |
| C08L 33/26 | (2006.01) |
| C08L 51/00 | (2006.01) |
| C08L 101/08 | (2006.01) |
| B41M 5/44 | (2006.01) |
| C09D 151/00 | (2006.01) |

(52) U.S. Cl.
CPC ............ *B41M 5/3372* (2013.01); *B41M 5/44* (2013.01); *C08F 265/08* (2013.01);
(Continued)

(58) Field of Classification Search
CPC ...... B41M 5/337; B41M 5/3372; B41M 5/44; B41M 2205/04; B41M 2205/40; C09D 151/003; C09D 151/03; C08L 51/003
(Continued)

(56) References Cited

U.S. PATENT DOCUMENTS 2,300,920 A   11/1942  Hener
5,210,066 A   5/1993   Sakurai et al.
(Continued)

FOREIGN PATENT DOCUMENTS

EP   0 022 633 A2   1/1981
EP   0 073 529 A2   3/1983
(Continued)

OTHER PUBLICATIONS

International Preliminary Report on Patentability issued in International Patent Application No. PCT/JP2015/064232 dated Dec. 1, 2016.
(Continued)

*Primary Examiner* — Bruce H Hess
(74) *Attorney, Agent, or Firm* — Foley & Lardner LLP

(57) ABSTRACT

An aqueous dispersion resin composition contains a first polymer produced by polymerizing a first monomer component containing (meth)acrylamide and a second polymer produced by polymerizing a second monomer component containing a carboxy group-containing vinyl monomer, wherein at least a portion of the carboxy group in the second polymer is neutralized.

15 Claims, 1 Drawing Sheet

(52) U.S. Cl.
CPC ............ *C08F 265/10* (2013.01); *C08L 33/14* (2013.01); *C08L 33/26* (2013.01); *C08L 51/00* (2013.01); *C08L 51/003* (2013.01); *C08L 101/08* (2013.01); *C09D 151/003* (2013.01); *B41M 2205/04* (2013.01); *B41M 2205/40* (2013.01)

(58) Field of Classification Search
USPC ........................................ 503/214, 226, 216
See application file for complete search history.

(56) References Cited

U.S. PATENT DOCUMENTS

| | | |
|---|---|---|
| 5,246,981 A | 9/1993 | Kawamoto et al. |
| 5,273,824 A | 12/1993 | Hoshino et al. |
| 2008/0071039 A1 | 3/2008 | Etoh et al. |
| 2010/0248958 A1 | 9/2010 | Etoh et al. |

FOREIGN PATENT DOCUMENTS

| | | |
|---|---|---|
| JP | S56-032513 A | 4/1981 |
| JP | H04-211411 A | 8/1992 |
| JP | H05-069665 A | 3/1993 |
| JP | H06-073139 A | 3/1994 |
| JP | H10-036458 | 2/1998 |
| JP | 2000-027097 A | 1/2000 |

OTHER PUBLICATIONS

International Search Report issued in International Patent Application No. PCT/JP2015/064232 dated Aug. 11, 2015.
Extended European Search Report dated Nov. 29, 2017 in corresponding application No. 15795630.1.

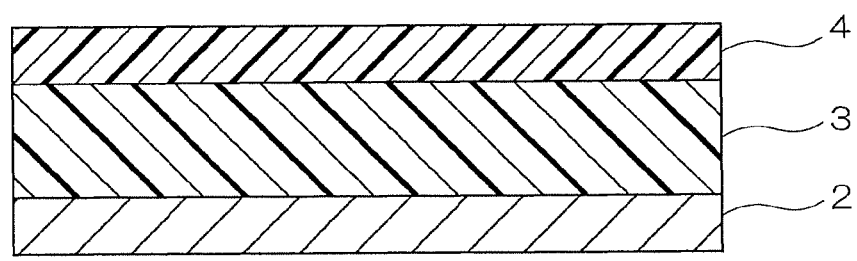
1

AQUEOUS DISPERSION RESIN COMPOSITION, RESIN COMPOSITION FOR A THERMAL RECORDING LAYER, RESIN COMPOSITION FOR A PROTECTION LAYER, AND THERMAL RECORDING MATERIAL

CROSS-REFERENCE TO RELATED APPLICATIONS

The present application is a U.S. national stage application claiming the benefit of International Patent Application No. PCT/JP2015/064232, filed May 18, 2015, which claims the benefit of priority to Japanese Patent Application No. 2014-103930, filed May 20, 2014, the entireties of which are hereby incorporated by reference.

TECHNICAL FIELD

The present invention relates to an aqueous dispersion resin composition, a resin composition for a thermal recording layer, a resin composition for a protection layer, and a thermal recording material. In particular, the present invention relates to an aqueous dispersion resin composition, a resin composition for a thermal recording layer containing the aqueous dispersion resin composition, a resin composition for a protection layer containing the aqueous dispersion resin composition, and furthermore, a thermal recording material produced by using the resin composition for a thermal recording layer and the resin composition for a protection layer.

BACKGROUND ART

Thermal recording materials are formed by laminating a thermal recording layer and a protection layer sequentially on a support layer such as paper and a plastic film, and are widely used as, for example, facsimile, and print sheet.

The thermal recording layer and the protection layer of such a thermal recording material are formed from a resin material such as acrylic resin. For the resin material, for example, Patent Document 1 has proposed a core-shell type copolymer emulsion produced by copolymerizing 90 parts of methacrylamide and 10 parts of methacrylic acid in the presence of seed emulsion produced by 46 parts of acrylonitrile, 46 parts of butyl acrylate, 5 parts of 2-hydroxyethyl methacrylate, and 3 parts of methacrylic acid (Production Example C).

By using the thus produced copolymer emulsion as the thermal recording layer and the protection layer of the thermal recording material, a thermal recording material with excellent running stability (anti-sticking properties) and durability (heat resistance, plasticizer resistance, anti-blocking, water resistance, solvent resistance, oil resistance) can be produced.

For the methods for forming the thermal recording layer and the protection layer using the copolymer emulsion, for example, curtain coating is known: in curtain coating, a copolymer emulsion is allowed to fall in the form of curtain while a support layer is passed through the liquid.

CITATION LIST

Patent Document

Patent Document 1 Japanese Unexamined Patent Publication No. Hei 5-69665

SUMMARY OF THE INVENTION

Problem to be Solved by the Invention

However, the copolymer emulsion described in Cited Document 1 has insufficient spinnability, and when curtain coating is used, improvement in application properties may be demanded.

An object of the present invention is to provide a thermal recording material with excellent running stability and durability, and furthermore, an aqueous dispersion resin composition with excellent spinnability, a resin composition for a thermal recording layer containing the aqueous dispersion resin composition, a resin composition for a protection layer containing the aqueous dispersion resin composition, and a thermal recording material produced by using the resin composition for a thermal recording layer and the resin composition for a protection layer.

Means for Solving the Problem

The present invention includes,

[1] An aqueous dispersion resin composition including a first polymer produced by polymerizing a first monomer component containing (meth)acrylamide and a second polymer produced by polymerizing a second monomer component containing a carboxy group-containing vinyl monomer, wherein at least a portion of the carboxy group in the second polymer is neutralized;

[2] The aqueous dispersion resin composition of [1] described above, wherein the carboxy group-containing vinyl monomer content relative to 100 parts by mass of the second monomer component is 4 parts by mass or more and 20 parts by mass or less;

[3] The aqueous dispersion resin composition of [1] or [2] described above, wherein the (meth)acrylamide content relative to 100 parts by mass of the first monomer component is 50 parts by mass or more and 100 parts by mass or less;

[4] The aqueous dispersion resin composition of any one of [1] to [3] described above, wherein the first monomer component further contains a carboxy group-containing vinyl monomer and/or a hydroxyl group-containing vinyl monomer;

[5] The aqueous dispersion resin composition of any one of [1] to [4] described above, wherein the second monomer component further contains (meth)acrylonitrile, and the (meth)acrylonitrile content relative to 100 parts by mass of the second monomer component is 15 parts by mass or more and 90 parts by mass or less;

[6] The aqueous dispersion resin composition of any one of [1] to [5] described above, wherein the first polymer content relative to 100 parts by mass of the second polymer is 5 parts by mass or more and 500 parts by mass or less;

[7] The aqueous dispersion resin composition of any one of [1] to [6] described above, wherein the carboxylic acid salt formed by neutralizing at least a portion of the carboxy group is ammonium salt;

[8] The aqueous dispersion resin composition of any one of [1] to [7] described above, wherein the carboxy group in the second polymer is neutralized by adding salt-containing water after polymerizing the second monomer component, and then kept for 30 minutes or more;

[9] The aqueous dispersion resin composition of any one of [1] to [8] described above, wherein the first monomer component and/or the second monomer component further contains a sulfonic acid group-containing vinyl monomer and/or its salt;

[10] The aqueous dispersion resin composition of [9] described above, wherein when the first monomer component contains the sulfonic acid group-containing vinyl monomer and/or its salt, the content thereof relative to 100 parts by mass of a total of the first monomer component is 0.01 parts by mass or more and 20 parts by mass or less, and when the second monomer component contains the sulfonic acid group-containing vinyl monomer and/or its salt, the content thereof relative to 100 parts by mass of a total of the second monomer component is 0.01 parts by mass or more and 20 parts by mass or less;

[11] A resin composition for a thermal recording layer, wherein the resin composition is used for a thermal recording layer of a thermal recording material; the thermal recording material includes a support layer, a thermal recording layer, and a protection layer; and the resin composition for a thermal recording layer includes the aqueous dispersion resin composition of any one of [1] to [10] described above;

[12] A resin composition protection layer, wherein the resin composition is used for a protection layer of a thermal recording material, the thermal recording material includes a support layer, a thermal recording layer, and a protection layer, and the resin composition for a protection layer includes the aqueous dispersion resin composition of any one of [1] to [10] described above;

[13] A thermal recording material including a support layer, a thermal recording layer laminated on one side in the thickness direction of the support layer, and a protection layer laminated on one side in the thickness direction of the thermal recording layer, wherein the thermal recording layer includes a cured product of the resin composition for a thermal recording layer of [11] described above;

[14] The thermal recording material of [13] described above produced by applying the resin composition for a thermal recording layer to the support layer by curtain coating, curing the resin composition for a thermal recording layer to form the thermal recording layer, and laminating the protection layer on the thermal recording layer;

[15] A thermal recording material including a support layer, a thermal recording layer laminated on one side in the thickness direction of the support layer, and a protection layer laminated on one side in the thickness direction of the thermal recording layer, wherein the protection layer includes a cured product of the resin composition for a protection layer of [12] described above; and

[16] The thermal recording material of [15] described above produced by laminating the thermal recording layer on the support layer, then applying the resin composition for a protection layer to the thermal recording layer by curtain coating, and curing the resin composition for a protection layer.

Effect of the Invention

Use of the aqueous dispersion resin composition, resin composition for a thermal recording layer, and resin composition for a protection layer of the present invention allows for thermal recording material with excellent running stability and durability, and furthermore excellent spinnability.

Furthermore, the thermal recording material of the present invention has excellent running stability and durability.

BRIEF DESCRIPTION OF THE DRAWINGS

FIG. 1 is a schematic diagram illustrating an embodiment of the thermal recording material of the present invention.

DESCRIPTION OF EMBODIMENTS

An aqueous dispersion resin composition of the present invention contains a first polymer produced by polymerizing a first monomer component and a second polymer produced by polymerizing a second monomer component.

The first monomer component contains, as an essential component, (meth)acrylamide. (Meth)acryl include acryl and methacryl (the same applies to the following).

The first monomer component preferably contains methacrylamide. This allows for improvement in heat resistance (anti-sticking properties), plasticizer resistance, and solvent resistance.

The first monomer component can contain, as an optional component, a copolymerizable monomer that is copolymerizable with (meth)acrylamide (hereinafter referred to as first copolymerizable monomer).

Examples of the first copolymerizable monomer include alkyl (meth)acrylate, functional group-containing vinyl monomers, vinyl esters, aromatic vinyl monomers, N-substituted unsaturatedcarboxylic acid amides, heterocyclic vinyl compounds, vinylidene halide compounds, α-olefins, and dienes.

Examples of the alkyl (meth)acrylate include alkyl (meth) acrylate having an alkyl moiety with 1 to 8 carbon atoms, including methyl (meth)acrylate, ethyl (meth)acrylate, n-butyl (meth)acrylate, and 2-ethylhexyl (meth)acrylate.

Examples of the functional group-containing vinyl monomer include a carboxy group-containing vinyl monomer, a hydroxyl group-containing vinyl monomer, an amino group-containing vinyl monomer, a glycidyl group-containing vinyl monomer, a cyano group-containing vinyl monomer, a sulfonic acid group-containing vinyl monomer and its salt, an acetoacetoxy group-containing vinyl monomer, and a phosphoric acid group-containing compound.

Examples of the carboxy group-containing vinyl monomer include (meth)acrylic acid, maleic anhydride, fumaric acid, itaconic acid, and crotonic acid.

Examples of the hydroxyl group-containing vinyl monomer include 2-hydroxyethyl (meth)acrylate and 2-hydroxypropyl (meth)acrylate.

Examples of the amino group-containing vinyl monomer include 2-aminoethyl (meth)acrylate, 2-(N-methylamino) ethyl (meth)acrylate, and 2-(N,N-dimethylamino) ethyl (meth)acrylate.

Examples of the glycidyl group-containing vinyl monomer include glycidyl (meth)acrylate.

Examples of the cyano group-containing vinyl monomer include (meth)acrylonitrile.

Examples of the sulfonic acid group-containing vinyl monomer include allylsulfonic acid and methallylsulfonic acid. The salt thereof includes, for example, alkali metal salt such as sodium salt, potassium salt, and for example, ammonium salt of the above-described sulfonic acid group-containing vinyl monomer. To be specific, for example, sodium allylsulfonate, sodium methallylsulfonate, and methallylsulfonic acid ammonium are used.

Examples of the acetoacetoxy group-containing vinyl monomer include acetoacetoxyethyl (meth)acrylate.

For the phosphoric acid group-containing compound, for example, 2-methacryloyloxyethyl acid phosphate is used.

Examples of the vinyl esters include vinyl acetate and vinyl propionate.

Examples of the aromatic vinyl monomer include styrene, α-methylstyrene, and divinylbenzene.

Examples of the N-substituted unsaturated carboxylic acid amide include N-methylol (meth)acrylamide.

Examples of the heterocyclic vinyl compound include vinylpyrrolidone.

Examples of the vinylidene halide compound include vinylidene chloride and vinylidene fluoride.

Examples of the α-olefins include ethylene and propylene.

Examples of the dienes include butadiene.

Examples of the first copolymerizable monomer include a crosslinking vinyl monomer.

Examples of the crosslinking vinyl monomer include a compound containing two or more vinyl groups, including methylenebis(meth)acrylamide, divinylbenzene, and polyethylene glycol chain containing di (meth)acrylate.

These first copolymerizable monomers may be used singly or in combination of two or more.

For the first copolymerizable monomer, preferably, a functional group-containing vinyl monomer, an aromatic vinyl monomer, or a combination thereof is used, and more preferably, a functional group-containing vinyl monomer is used singly.

Use of the functional group-containing vinyl monomer singly as the first copolymerizable monomer improves plasticizer resistance.

For the first copolymerizable monomer, even more preferably, a carboxy group-containing vinyl monomer, a hydroxyl group-containing vinyl monomer, a sulfonic acid group-containing vinyl monomer, or a combination thereof is used, even more preferably, a carboxy group-containing vinyl monomer, a hydroxyl group-containing vinyl monomer, or a combination thereof is used, and particularly preferably, (meth)acrylic acid, 2-hydroxyethyl (meth)acrylate, or a combination thereof is used.

Use of the above-described monomer as the first copolymerizable monomer improves water solubility of the first polymer, and stabilizes aqueous dispersion resin composition.

As described above, (meth)acryl includes acryl and methacryl; however, in the first monomer component, in view of water resistance, preferably, methacryl is used.

In the first monomer component, the (meth)acrylamide content and the first copolymerizable monomer content relative to 100 parts by mass of the first monomer component are as follows. The (meth)acrylamide content relative to 100 parts by mass of the first monomer component is, for example, 50 parts by mass or more, preferably 70 parts by mass or more, and for example, 100 parts by mass or less, preferably 85 parts by mass or less. The first copolymerizable monomer content relative to 100 parts by mass of the first monomer component is, for example, 0 part by mass or more, preferably 15 parts by mass or more, and for example, 50 parts by mass or less, preferably 30 parts by mass or less.

That is, the first monomer component may be composed of only (meth)acrylamide without containing the first copolymerizable monomer, or the first monomer component may be composed of a combination of the (meth)acrylamide and the first copolymerizable monomer at the above-described ratio. Preferably, the (meth)acrylamide and the first copolymerizable monomer are used in combination at the above-described ratio.

The (meth)acrylamide content and the first copolymerizable monomer content in the above-described range allows for production of a thermal recording material with excellent durability (particularly heat resistance, solvent resistance, and plasticizer resistance).

When the first monomer component contains a sulfonic acid group-containing vinyl monomer and/or its salt, the content of the sulfonic acid group-containing vinyl monomer and/or its salt relative to 100 parts by mass of a total of the first monomer component is, for example, 0.01 parts by mass or more, preferably 0.2 parts by mass or more, and for example, 20 parts by mass or less, preferably 5 parts by mass or less, more preferably 1 part by mass or less.

When the content of the sulfonic acid group-containing vinyl monomer and/or its salt is within the above-described range, the viscosity can be reduced while suppressing reduction in the molecular weight of the first polymer, and workability can be improved.

Polymerization of the first monomer component is not particularly limited, and a known polymerization method is used. For example, water, a first monomer component, and a polymerization initiator are blended, and the first monomer component is polymerized in water.

The polymerization initiator is not particularly limited, and examples thereof include water soluble initiators such as persulfate (ammonium persulfate, potassium persulfate, etc.), hydrogen peroxide, organic hydroperoxide, and 4,4'-azobis(4-cyanovaleric acid); oil-soluble initiators such as benzoyl peroxide and azobisisobutyronitrile; and redox initiators. These polymerization initiators may be used singly or in combination of two or more.

The mixing ratio of the polymerization initiator is set suitably in accordance with the purpose and application, and is, for example, 0.1 parts by mass or more, and for example, 20 parts by mass or less, preferably 10 parts by mass or less relative to 100 parts by mass of the first monomer component.

The polymerization conditions are as follows: under normal pressure, the polymerization temperature is, for example, 30° C. or more, preferably 50° C. or more, and for example, 95° C. or less, preferably 85° C. or less. The polymerization time is, for example, 1 hour or more, preferably 2 hours or more, and for example, 30 hours or less, preferably 20 hours or less.

In the production of the first polymer, in view of improvement in production stability, as necessary, an emulsifier (surfactant) described later can be blended.

In the production of the first polymer, in view of improvement in production stability, for example, known additives can be blended at a suitable ratio, including a pH adjustment agent, sequestrants such as for example, ethylenediaminetetra acetic acid and its salt, and molecular weight modifiers (chain transfer agent) such as for example, mercaptans, and low molecular weight halogen compounds.

The first polymer has a weight-average molecular weight of, based on polystyrene standard calibration in gel permeation chromatography (GPC) measurement, for example, 5000 or more, preferably 10000 or more, and for example, 1000000 or less, preferably 500000 or less.

The second monomer component contains, as an essential component, a carboxy group-containing vinyl monomer.

Examples of the carboxy group-containing vinyl monomer include the carboxy group-containing vinyl monomer given as examples for the above-described first copolymerizable monomer, and to be specific, examples thereof include, ethylenic unsaturated monobasic carboxylic acid such as (meth)acrylic acid and crotonic acid, and their alkylesters; and ethylenic unsaturated dibasic carboxylic acid such as itaconic acid, maleic acid, fumaric acid, and their alkylesters.

These carboxy group-containing vinyl monomers may be used singly or in combination of two or more. For the carboxy group-containing vinyl monomer, preferably, ethylenic unsaturated monobasic carboxylic acid is used, more preferably, (meth)acrylic acid is used, and in view of improvement in water resistance, even more preferably, methacrylic acid is used.

The second monomer component can contain, as an optional component, a copolymerizable monomer that is copolymerizable with carboxy group-containing vinyl monomer (hereinafter referred to as second copolymerizable monomer).

Examples of the second copolymerizable monomer include the above-described alkyl (meth)acrylate, the above-described functional group-containing vinyl monomer (excluding the carboxy group-containing vinyl monomer), the above-described vinyl esters, the above-described aromatic vinyl monomers, the above-described N-substituted unsaturated carboxylic acid amide, the above-described heterocyclic vinyl compound, the above-described vinylidene halide compound, the above-described α-olefins, the above-described dienes, and the above-described crosslinking vinyl monomer.

Examples of the second copolymerizable monomer further include, as the functional group-containing vinyl monomer, an amide group-containing vinyl monomer such as (meth)acrylamide.

These second copolymerizable monomers may be used singly or in combination of two or more.

For the second copolymerizable monomer, preferably, alkyl (meth)acrylate (particularly preferably, methyl (meth)acrylate and n-butyl (meth)acrylate are used in combination), functional group-containing vinyl monomers, and aromatic vinyl monomers are used, more preferably, these are used in combination, even more preferably, alkyl (meth)acrylate and a functional group-containing vinyl monomer are used in combination.

For the second copolymerizable monomer, even more preferably, a cyano group-containing vinyl monomer, and particularly preferably, (meth)acrylonitrile is used.

In the second monomer component, the carboxy group-containing vinyl monomer content and the second copolymerizable monomer content relative to 100 parts by mass of the second monomer component are as follows: the carboxy group-containing vinyl monomer content relative to 100 parts by mass of the second monomer component is, for example, 4 parts by mass or more, preferably 4.5 parts by mass or more, and 20 parts by mass or less, preferably 10 parts by mass or less. The second copolymerizable monomer content relative to 100 parts by mass of the second monomer component is, 80 parts by mass or more, preferably 90 parts by mass or more, and 96 parts by mass or less, preferably 95.5 parts by mass or less.

The carboxy group-containing vinyl monomer content and the second copolymerizable monomer content within the above-described range allows for production of a thermal recording material with excellent swellability, easy film-forming, and excellent durability (water resistance•solvent resistance), and allows for production of an aqueous dispersion resin composition with excellent spinnability.

When the second monomer component contains (meth)acrylonitrile, the (meth)acrylonitrile content relative to 100 parts by mass of the second monomer component is, for example, 15 parts by mass or more, preferably 30 parts by mass or more, more preferably 40 parts by mass or more, and for example, 90 parts by mass or less, preferably 80 parts by mass or less.

When the second monomer component contains (meth)acrylonitrile at the above-described ratio, a thermal recording material with excellent durability (particularly, heat resistance, solvent resistance, plasticizer resistance, and oil resistance) can be produced.

When the second monomer component contains sulfonic acid group-containing vinyl monomer and/or its salt, the content of the sulfonic acid group-containing vinyl monomer and/or its salt relative to 100 parts by mass of a total of the second monomer component is, for example, 0.01 parts by mass or more, preferably 0.2 parts by mass or more, and for example, 20 parts by mass or less, preferably 5 parts by mass or less, more preferably 1 part by mass or less.

The content of the sulfonic acid group-containing vinyl monomer and/or its salt within the above-described range allows for reduction in the viscosity while suppressing the reduction of the molecular weight of the second polymer, and allows for improvement in workability.

Polymerization of the second monomer component is not particularly limited, and a known polymerization method is used. For example, water, the second monomer component is blended with the polymerization initiator, and the second monomer component is polymerized in water.

The polymerization initiator is not particularly limited, and those polymerization initiators given as examples of the above-described first monomer component are used. These polymerization initiators may be used singly or in combination of two or more.

The mixing ratio of the polymerization initiator is set suitably in accordance with the purpose and application, and the mixing ratio of the polymerization initiator relative to 100 parts by mass of the second monomer component is, for example, 0.1 parts by mass or more, 20 parts by mass or less.

The polymerization conditions are as follows: under normal pressure, the polymerization temperature is, for example, 30° C. or more, preferably 50° C. or more, and for example, 95° C. or less, preferably 85° C. or less. The polymerization time is, for example, 1 hour or more, preferably 2 hours or more, and for example, 30 hours or less, preferably 20 hours or less.

In the production of the second polymer, in view of improvement in production stability, as necessary, the above-described emulsifier (surfactant) can be blended.

Examples of the emulsifier include an anionic surfactant, a cationic surfactant, and a nonionic surfactant, and preferably, an anionic surfactant and a nonionic surfactant are used. To be specific, examples include anionic surfactants such as higher alcohol sulfate, alkylbenzene sulfonate (dodecylbenzenesulfonate, etc.), aliphatic sulfonate, and alkyldiphenylether sulfonate; and nonionic surfactants such as alkylester, alkylphenylether, and alkylether of polyethylene glycol.

These emulsifiers may be used singly or in combination of two or more.

The mixing ratio of the emulsifier is set suitably in accordance with the purpose and application.

In the production of the second polymer, in view of improvement in production stability, known additives can be blended at a suitable ratio, including, for example, pH adjustment agents, for example, sequestrants such as ethylenediaminetetraacetic acid and its salt, and for example, molecular weight modifiers (chain transfer agent) such as mercaptans and low molecular weight halogen compounds.

In the present invention, at least a portion of the carboxy group contained in the second polymer is neutralized (carboxylation). That is, the second polymer contains carboxy groups derived from the carboxy group-containing vinyl monomer of the second monomer component, and the carboxy group is neutralized by a neutralizing agent, and salificated.

To be more specific, in this method, for example, after polymerizing the second monomer component, the neutralizing agent is added, and at a predetermined temperature, the temperature is kept for 30 minutes or more. The carboxy groups in the second polymer are neutralized in this manner (swelling and softening treatment).

Examples of the neutralizing agent include alkali metalhydroxide (sodium hydroxide, potassium hydroxide, etc.), amines, and ammonia. The neutralizing agent is preferably used as a salt-containing water, to be specific, as an aqueous solution of alkali metalhydroxide and ammonia water. These neutralizing agents may be used singly or in combination of two or more.

For the neutralizing agent, preferably, ammonia is used.

The mixing ratio of the neutralizing agent relative to 100 mol of the carboxy group-containing vinyl monomer contained in the second monomer component is, for example, 20 mol or more, preferably 25 mol or more, more preferably 30 mol or more, and for example, 200 mol or less, preferably 150 mol or less, more preferably 120 mol or less.

The conditions for the temperature keeping after adding the neutralizing agent are as follows: the temperature to be kept is, for example, 40° C. or more, preferably 50° C. or more, and for example, 90° C. or less, preferably 80° C. or less. The temperature is kept for, for example, 30 minutes or more, preferably 1 hour or more, and for example, 12 hours or less, preferably 10 hours or less.

By keeping the temperature with the above-described conditions, carboxy group is neutralized and carboxylic acid salt is formed. For example, when ammonia water is used as the neutralizing agent, neutralization of the carboxy group forms ammonium salt.

By neutralizing the carboxy group in this manner, the thermal recording material with excellent running stability and durability can be produced, and furthermore, an aqueous dispersion resin composition with excellent spinnability can be produced.

In particular, when ammonia water is used as the neutralizing agent, excellent workability is achieved, and when ammonium salt is formed as carboxylic acid salt, improvement in water resistance is achieved, and furthermore, a thermal recording material with excellent color development can be produced.

When the keeping is not performed as described above, carboxy groups cannot be neutralized, and therefore disadvantages such as poor spinnability, running stability, and durability may be caused.

For example, by analyzing the neutralizing agent (counter cation) in the aqueous dispersion resin composition with various analyzers such as a FT-IR device, a thermal decomposition GC-MS device, a head space GC-MS device, and an element analyzer, neutralization of the carboxy group can be confirmed.

The second polymer has a weight-average molecular weight measured by polystyrene standard calibration with gel permeation chromatography (GPC) of, for example, 10000 or more, preferably 50000 or more, and for example, 2000000 or less, preferably 1000000 or less.

The second polymer has a solubility parameter (SP value) of, for example, 9.5 $(cal/cm^3)^{1/2}$ or more, and for example, 13 $(cal/cm^3)^{1/2}$ or less. When (meth)acrylonitrile is used, preferably 10.8 $(cal/cm^3)^{1/2}$ or more.

When the second polymer has a solubility parameter (SP value) within the above-described range, anti-blocking and adhesiveness can be improved.

The second polymer has a glass transition temperature of, for example, 20° C. or more, preferably 25° C. or more, and for example, 130° C. or less, preferably 125° C. or less. When (meth)acrylonitrile is used, preferably, 30° C. or more, 130° C. or less.

When the second polymer has a glass transition temperature within the above-described range, film-forming properties and durability (heat resistance) can be improved.

For the solubility parameter and the glass transition temperature, the values calculated by a calculation software CHEOPS (version 4.0) of Million Zillion Software are used. The calculation method used in the calculation software is the method described in Computational Materials Science of Polymers (A. A. Askadskii, Cambridge Intl Science Pub (2005 Dec. 30)) Chapter XII (the same applies in the following).

The aqueous dispersion resin composition is not particularly limited as long as the above-described first polymer and the above-described second polymer are contained, and for example, the aqueous dispersion resin composition can be produced by separately producing the first polymer and the second polymer by the above-described method, and then mixing them.

In the aqueous dispersion resin composition, the first polymer content and the second polymer content are as follows: the first polymer content relative to 100 parts by mass of the second polymer is, for example, 5 parts by mass or more, preferably 10 parts by mass or more, and for example, 500 parts by mass or less, preferably 200 parts by mass or less.

When the first polymer content and the second polymer content are within the above-described range, an aqueous dispersion resin composition can be produced with excellent workability, and running stability and durability can be improved.

The aqueous dispersion resin composition has a solid content concentration of, for example, 10 mass % or more, preferably 15 mass % or more, and for example, 60 mass % or less, preferably 50 mass % or less.

The aqueous dispersion resin composition has a pH of, for example, 5.5 or more, preferably 6.0 or more, and for example, 11 or less, preferably 10 or less.

In another possible method, for example, first, the first polymer is produced, and the second polymer is produced in the presence of the produced first polymer. Furthermore, for example, first, the second polymer can be produced, and the first polymer can be produced in the presence of the second polymer produced.

Preferably, first, the first polymer is produced, and the second polymer is produced in the presence of the produced first polymer, or first the second polymer is produced, and the first polymer is produced in the presence of the produced second polymer.

By such a method, the aqueous dispersion resin composition can be produced as particles (core-shell particles) in which the second polymer is covered with the first polymer.

Particularly preferably, first, the second polymer is produced, and the first polymer is produced in the presence of the produced second polymer.

By producing the aqueous dispersion resin composition as core-shell particles, running stability and durability can be improved.

In this manner, core-shell particles in which the core polymer is partially covered with the shell polymer are produced. With such an aqueous dispersion resin composition containing core-shell particles, a thermal recording material with excellent running stability and durability can be produced, and furthermore, excellent spinnability can be achieved.

The aqueous dispersion resin composition can further contain a non-crosslinking urea compound.

The non-crosslinking urea compound has a molecular weight of 1000 or less, and is defined as a urea compound that does not form a crosslinking structure with the above-described first polymer and the above-described second polymer.

Examples of the non-crosslinking urea compound include, for example, urea or urea derivative having one or less methylol group in its molecule.

For the non-crosslinking urea compound, for example, a compound represented by formula (1) or (2) below is used.

[Chemical Formula 1]

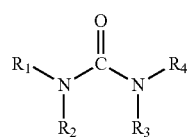

(1)

(in the above-described formula (1), $R_1$ to $R_4$ independently represents a hydrogen atom, or a C1 to C12 alkyl group which may have a hydroxyl group, and two or more of $R_1$ to $R_4$ do not have hydroxyl groups simultaneously.)

[Chemical Formula 2]

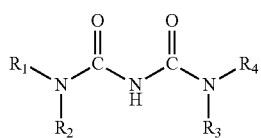

(2)

(in the above-described formula (2), $R_1$ to $R_4$ independently represents a hydrogen atom, or a C1 to C12 alkyl group which may have a hydroxyl group, and two or more of $R_1$ to $R_4$ do not have hydroxyl groups simultaneously.)

$R_1$ to $R_4$ independently represents a hydrogen atom, or a C1 to C12 alkyl group which may have a hydroxyl group such as, for example, straight chain alkyl groups such as a methyl group, ethyl group, n-propyl group, n-butyl group, and n-hexyl, for example, branched alkyl groups such as an i-propyl group, i-butyl group, and t-butyl group, and monohydroxy alkyl groups such as 2-hydroxyethyl group and 3-hydroxypropyl group.

For $R_1$ to $R_4$, preferably, a hydrogen atom and an alkyl group having 1 to 9 carbon atoms are used, even more preferably, a hydrogen atom, a methyl group, and an ethyl group are used.

However, two or more of $R_1$ to $R_4$ does not have a hydroxyl group simultaneously. That is, when one of $R_1$ to $R_4$ is a C1 to C12 alkyl group having a hydroxyl group, the remaining three of them are hydrogen atoms, or a C1 to C12 alkyl group having no hydroxyl group.

In a preferable embodiment of the above-described formula (1) and the above-described formula (2), two of $R_1$ to $R_4$ are alkyl groups having 1 to 12 carbon atoms and having no hydroxyl group, and the remaining two are hydrogen atoms; one of $R_1$ to $R_4$ is a C1 to C12 alkyl group having a hydroxyl group, and the remaining three are hydrogen atoms; or all of $R_1$ to $R_4$ are hydrogen atoms.

In a more preferable embodiment, two of $R_1$ to $R_4$ are C1 to C12 alkyl groups having no hydroxyl group, and the remaining two are hydrogen atoms, or all of $R_1$ to $R_4$ are hydrogen atoms. In even more preferable embodiment, two of $R_1$ to $R_4$ are C1 to C12 alkyl group having no hydroxyl group, and the remaining two are hydrogen atoms.

Examples of the non-crosslinking urea compound include urea; monoalkylurea such as 1-alkyl urea; dialkyl ureas such as 1,1-dialkylurea, and 1,3-dialkylurea; hydroxyl alkyl ureas such as 1-hydroxyalkylurea; and urea derivatives such as biuret substances of the above-described monoalkylurea, the above-described dialkylurea, and the above-described hydroxyalkylurea.

Examples of the 1-monoalkylurea include 1-methylurea and 1-ethylurea, and preferably, 1-methylurea is used.

Examples of the 1,1-dialkylurea include 1,1-dimethylurea and 1,1-diethylurea, and preferably 1,1-dimethylurea is used.

Examples of the 1,3-dialkylurea include 1,3-dimethylurea and 1,3-diethylurea, and preferably, 1,3-dimethylurea is used.

Examples of the 1-hydroxyalkylurea include 1-(2-hydroxyethyl) urea and 1-(3-hydroxypropyl) urea.

Examples of the biuret substances of urea, the above-described monoalkylurea, the above-described dialkylurea, and the above-described hydroxyalkylurea include biuret (urea dimer, $C_2H_5N_3O_2$) and N,N-dimethylbiuret, and preferably, biuret (urea dimer, $C_2H_5N_3O_2$) is used.

For the non-crosslinking urea compound, preferably urea, 1-alkylurea, 1,1-dialkylurea, 1,3-dialkylurea, 1-hydroxyalkylurea, and biuret (urea dimer, $C_2H_5N_3O_2$), more preferably, urea, 1,1-dialkylurea, and 1,3-dialkylurea are used. Even more preferably, urea, 1,1-dimethylurea, or 1,3-dimethylurea is used.

The aqueous dispersion resin composition containing a non-crosslinking urea compound allows for improvement in water resistance and plasticizer resistance.

The mixing ratio of the non-crosslinking urea compound relative to 100 parts by mass of a total amount of the first polymer and the second polymer (solid content) is, for example, 0.1 parts by mass or more, preferably 1 part by mass or more, more preferably 2 parts by mass or more, further preferably 5 parts by mass or more, and for example, 50 parts by mass or less, preferably 40 parts by mass or less, more preferably 30 parts by mass or less, further preferably 20 parts by mass or less.

The mixing ratio of the non-crosslinking urea compound within the above-described range allows for improvement in water resistance and plasticizer resistance.

The aqueous dispersion resin composition can further contain other polymers (polymer excluding the first polymer and the second polymer) and a filler.

Examples of the other polymers include polyolefin resin, and to be specific, homopolymer and copolymers of α-olefin having 2 to 16 carbon atoms (e.g., ethylene, propylene, 1-butene, 3-methyl-1-butene, 4-methyl-1-pentene, 3-methyl-1-pentene, 1-heptene, 1-hexene, 1-octene, 1-decene, 1-dodecene, etc.). Preferably, homopolymers and copolymers of ethylene, propylene, and/or 1-butene are used.

When the other polymers are used, the mixing ratio of the other polymer is set suitably in accordance with the purpose and application.

To be more specific, when the polyolefin resin is blended as a lubricant, the mixing ratio of the polyolefin resin relative to 100 parts by mass of a total amount of the first polymer and the second polymer is, for example, 0.5 parts by mass or more, preferably 2 parts by mass or more, more preferably 3 parts by mass or more, even more preferably 5 parts by mass or more, and for example, 50 parts by mass or less, preferably 40 parts by mass or less, more preferably 35 parts by mass or less, even more preferably 30 parts by mass or less.

Examples of the filler include inorganic fillers such as calcium carbonate, magnesium carbonate, kaolin, talc, clay, aluminum hydroxide, barium sulfate, silicon oxide, titanium oxide, zinc oxide, and colloidal silica; and organic fine particles such as urea-formalin resin and polystyrene micropowder. These fillers may be used singly or in combination of two or more.

The mixing ratio of the filler is set suitably in accordance with the purpose and application.

Furthermore, the aqueous dispersion resin composition can contain known additives in a range that does not hinder the excellent effects of the present invention, including, lubricants (lubricant excluding polyolefin resin) such as higher fatty acid metal salt and higher fatty acid amide; cross-linking agents (water resistant agent) such as ammonium zirconium carbonate, polyamide epichlorohydrin and modified substance thereof; a film-forming auxiliary agent; an ultraviolet absorber; an antioxidant; an antifoaming agent; a wetting agent; a viscosity adjustment agent; and other auxiliary agents. The additive content is set suitably in accordance with the purpose and application.

Use of the thus produced aqueous dispersion resin composition allows for production of thermal recording material with excellent running stability and durability, and furthermore, excellent spinnability.

Therefore, the aqueous dispersion resin composition can be suitably used as a resin composition for a thermal recording layer for forming a thermal recording layer and a resin composition for a protection layer for forming a protection layer in a thermal recording material including a support layer, a thermal recording layer, and a protection layer.

To be more specific, in FIG. 1, a thermal recording material 1 includes a support layer 2, a thermal recording layer 3 laminated on one side in the thickness direction of the support layer 2, and a protection layer 4 laminated on one side in the thickness direction of the thermal recording layer 3.

Examples of the support layer 2 include paper and a plastic sheet. The thickness of the support layer 2 is set suitably in accordance with the purpose and application.

The thermal recording layer 3 is formed as a cured product of the resin composition for a thermal recording layer.

The resin composition for a thermal recording layer contains, for example, the above-described aqueous dispersion resin composition, a dye, and a developer.

Examples of the dye include known basic organic dyes such as a fluoran organic dye, a triallylmethane organic dye, and a phenoxazine organic dye.

The developer is not particularly limited, and examples thereof include known developers such as a phenolic compound and aromatic carboxylic acid.

The mixing ratio of the developer relative to 100 parts by mass of the dye is, for example, 100 parts by mass or more, and for example, 3000 parts by mass or less.

By wet milling and mixing these dye and developer in the presence of the above-described aqueous dispersion resin composition, a resin composition for a thermal recording layer is produced. By dispersing dyes and developers in the presence of an aqueous resin composition (e.g., polyvinyl alcohol, etc.) other than the above-described aqueous dispersion resin composition, and mixing the produced dispersion liquid and the above-described aqueous dispersion resin composition as well, a resin composition for a thermal recording layer can be produced.

The mixing ratio in the resin composition for a thermal recording layer is not particularly limited, but the aqueous dispersion resin composition solid content relative to 100 parts by mass of a total amount of the dye and the developer is, for example, 5 parts by mass or more, preferably 10 parts by mass or more, and for example, 30 parts by mass or less, preferably 20 parts by mass or less.

The resin composition for a thermal recording layer can contain, as necessary, inorganic pigment such as calcium carbonate, talc, and kaolin; and sensitizers such as benzophenone ultraviolet absorber, triazole ultraviolet absorber, wax, and fatty acid amide at a suitable ratio depending on its purpose and use.

Then, the resin composition for a thermal recording layer is applied to the support layer 2 so that it has a thickness of, for example, 2 to 20 $g/m^2$ by a known coating method such as curtain coating, roll coating, and blade coating, preferably, by curtain coating in view of improvement in production efficiency, and then dried and cured.

At this time, at least a portion of the carboxylic acid salt (e.g., ammonium salt) contained the second polymer in the above-described aqueous dispersion resin composition returns to the carboxy group, thereby forming the thermal recording layer 3. The conditions for drying and curing are suitably set in accordance with, for example, the formulation of the resin composition for a thermal recording layer.

The protection layer 4 is formed as a cured product of the resin composition for a protection layer.

For the resin composition for a protection layer, for example, the above-described aqueous dispersion resin composition can be used as is.

Then, the resin composition for a protection layer is applied to the thermal recording layer 3 so that it has a thickness of, for example, 1 to 10 $g/m^2$ by a known coating methods such as curtain coating, roll coating, and blade coating, and preferably by curtain coating in view of improvement in production efficiency, and dried and cured.

At this time, at least a portion of the carboxylic acid salt (e.g., ammonium salt) contained in the second polymer in the above-described aqueous dispersion resin composition returns to the carboxy group, thereby forming the protection layer 4. The conditions for drying and curing are suitably set in accordance with, for example, formulation of the resin composition for a protection layer.

Use of the above-described resin composition for a thermal recording layer and the resin composition for a protection layer allows for production of the thermal recording material with excellent running stability and durability, and furthermore, excellent spinnability.

Therefore, the produced thermal recording material has excellent running stability and durability.

In the above-described description, both of the thermal recording layer 3 and the protection layer 4 are formed from the above-described aqueous dispersion resin composition in the thermal recording material 1. However, for example, only one of the thermal recording layer 3 or the protection layer 4 can be formed from the above-described aqueous dispersion resin composition. In such a case, the thermal recording layer 3 or the protection layer 4 that is not formed from the above-described aqueous dispersion resin composition is formed from a known method.

In the description above, the thermal recording material 1 is composed of a support layer 2, a thermal recording layer 3, and a protection layer 4, but an intermediate layer (not shown) can be interposed between, for example, the support layer 2 and the thermal recording layer 3, or between the thermal recording layer 3 and the protection layer 4.

EXAMPLES

The present invention is described in further detail in the following with reference to Examples and Comparative Examples, but the present invention is not limited to these Examples. The "parts" and "%" are based on mass unless otherwise specified. The specific numeral values such as the mixing ratio (content), physical property value, and parameter used in description below can be replaced with the corresponding mixing ratio (content), the physical property value, and parameter, that is, the upper limit value (numeral values defined with "or less", "less than") or the lower limit value (numeral values defined with "or more", "more than") of the corresponding description used in the above-described "DESCRIPTION OF EMBODIMENTS".

<Aqueous Dispersion Resin Composition>

Example 1

A separable flask equipped with a mixer and a reflux condenser was charged with 60 parts of deionized water, 0.1 parts of sodium dodecylbenzene sulphonate, and 1.0 part of potassium persulfate, and after nitrogen gas replacement, the temperature was increased to 75° C. Then, an emulsion of the following composition (mixture of second monomer component, water, and emulsifier) was added continuously for about 4 hours, and then the mixture was allowed to stand at 75° C. for about 4 hours to complete polymerization, thereby producing a seed emulsion having a solid content of about 50%.

| Acrylonitrile | 55 parts |
|---|---|
| n-Butyl acrylate | 30 parts |
| Methacrylic acid | 10 parts |
| Methyl methacrylate | 5 parts |
| Sodium dodecylbenzene sulphonate | 0.3 parts |
| Deionized water | 40 parts |

Then, the same type of the separable flask was charged with 1000 parts of the seed emulsion produced as described above and 1600 parts of deionized water, and the temperature was increased to 75° C. Then, 2.0 parts of ammonium persulfate was added, and the mixture of the composition below (mixture of first monomer component and water) was continuously added for 2 hours while stirring. Thereafter, the mixture was allowed to stand for 2 hours, thereby completing polymerization.

| Methacrylamide | 70 parts |
|---|---|
| 2-Hydroxyethyl methacrylate | 15 parts |
| Methacrylic acid | 15 parts |
| Deionized water | 300 parts |

Thereafter, ammonia water was further added for alkalization, and the temperature (75° C.) was kept for further 3 hours, thereby giving swelling and softening treatment. Thereafter, the temperature was cooled to room temperature, thereby producing an aqueous dispersion resin composition having a pH adjusted to about 8.0 and having a solid content of about 20%.

Example 2

A separable flask equipped with a mixer, and a reflux condenser was charged with 100 parts of deionized water, 0.1 parts of sodium dodecylbenzene sulphonate, and 1.0 part of potassium persulfate, and after nitrogen gas replacement, the temperature was increased to 75° C. Then, an emulsion of the following composition (mixture of second monomer component, water, and emulsifier) was added continuously for about 4 hours, and then the mixture was allowed to stand at 75° C. for about 4 hours to complete polymerization, thereby producing a seed emulsion having a solid content of about 40%.

| Acrylonitrile | 40 parts |
|---|---|
| n-Butyl acrylate | 40 parts |
| Methacrylic acid | 6 parts |
| Methacrylamide | 10 parts |
| Styrene | 4 parts |
| Sodium dodecylbenzene sulphonate | 0.3 parts |
| Deionized water | 50 parts |

Then, the same type of the separable flask was charged with 1250 parts of seed emulsion produced as described above and 700 parts of deionized water, and the temperature was increased to 75° C. Then, 0.5 parts of ammonium persulfate was added, and the mixture of the composition below (mixture of first monomer component and water) was continuously added for 2 hours while stirring. Thereafter, the mixture was allowed to stand for 2 hours, thereby completing polymerization.

| Methacrylamide | 79.5 parts |
|---|---|
| 2-Hydroxyethyl Methacrylate | 10 parts |
| Methacrylic acid | 10 parts |
| Sodium methallyl sulfonate | 0.5 parts |
| Deionized water | 300 parts |

Thereafter, ammonia water was further added for alkalization, and the temperature (75° C.) was kept for further 3 hours, thereby giving swelling and softening treatment. Thereafter, the temperature was cooled to room temperature, thereby producing an aqueous dispersion resin composition having a pH adjusted to about 7.0 and having a solid content of about 25%.

Example 3

A separable flask equipped with a mixer, and a reflux condenser was charged with 230 parts of deionized water, and after nitrogen gas replacement, the temperature was increased to 70° C. Then, after adding 1.0 part of ammonium persulfate, the mixture of the composition below (mixture of first monomer component and water) was continuously added for 2 hours while stirring. Thereafter, the mixture was allowed to stand for 2 hours to complete polymerization, thereby producing an aqueous solution of copolymer resin having a solid content of about 16%.

| | |
|---|---|
| Methacrylamide | 82.5 parts |
| 2-Hydroxyethyl methacrylate | 5 parts |
| Methacrylic acid | 10 parts |
| Styrene | 2 parts |
| Sodium methallyl sulfonate | 0.5 parts |
| Deionized water | 300 parts |

Then, 170 parts of deionized water for solid content adjustment was added to 250 parts of the aqueous solution of copolymer resin produced as described above, and while conducting nitrogen replacement again, the temperature was increased to 75° C. Then, 0.5 parts of 4,4'-azobis(4-cyanovaleric acid) was added, and an emulsion of the following composition (mixture of second monomer component, water, and emulsifier) was added continuously for 4 hours, and the mixture was further allowed to stand at the temperature (75° C.) for 3 hours, thereby completing polymerization.

| | |
|---|---|
| Acrylonitrile | 45 parts |
| Butyl acrylate | 40 parts |
| Methacrylic acid | 5 parts |
| Methyl methacrylate | 10 parts |
| Sodium dodecylbenzene sulphonate | 0.1 parts |
| Deionized water | 40.0 parts |

Thereafter, ammonia water was further added for alkalization, and the temperature (75° C.) was kept for further 3 hours, thereby giving swelling and softening treatment. Thereafter, the temperature was cooled to room temperature, thereby producing an aqueous dispersion resin composition having a pH adjusted to about 6.0 and having a solid content of about 25%.

Comparative Example 1

A separable flask equipped with a mixer, and a reflux condenser was charged with 110 parts of deionized water, 0.1 parts of sodium dodecylbenzene sulphonate, and 1.0 part of potassium persulfate, and after nitrogen gas replacement, the temperature was increased to 70° C. Then, an emulsion of the following composition (mixture of second monomer component, water, and emulsifier) was added continuously for about 4 hours, and then the mixture was allowed to stand at 75° C. for about 4 hours to complete polymerization, thereby producing a seed emulsion having a solid content of about 40%.

| | |
|---|---|
| Acrylonitrile | 55 parts |
| n-Butyl acrylate | 35 parts |
| Methacrylic acid | 1 part |
| 2-Hydroxyethyl methacrylate | 7 parts |
| Methacrylamide | 2 parts |
| Sodium dodecylbenzene sulphonate | 0.3 parts |
| Deionized water | 40 parts |

Then, the same type of the separable flask was charged with 500 parts of seed emulsion produced as described above, and 800 parts of deionized water, and the temperature was increased to 75° C. Then, 2.0 parts of ammonium persulfate was added, and the mixture of the composition below (mixture of first monomer component and water) was continuously added for 2 hours while stirring. Thereafter, the mixture was allowed to stand for 2 hours, thereby completing polymerization.

| | |
|---|---|
| Methacrylamide | 70 parts |
| 2-Hydroxyethyl methacrylate | 20 parts |
| Methacrylic acid | 10 parts |
| Deionized water | 200 parts |

Thereafter, the temperature was cooled to 40° C. or less, and ammonia water was added for alkalization. The mixture was not allowed to stand at 40° C. or more. The aqueous dispersion resin composition having a pH adjusted to about 9.0 and having a solid content of about 20% was produced in this manner.

Comparative Example 2

A separable flask equipped with a mixer and a reflux condenser was charged with 370 parts of deionized water, and after nitrogen gas replacement, the temperature was increased to 70° C. Then, after adding 1.0 part of ammonium persulfate, the mixture of the composition below (mixture of first monomer component and water) was continuously added for 2 hours while stirring. Thereafter, the mixture was allowed to stand for 2 hours to complete polymerization, thereby producing an aqueous solution of copolymer resin having a solid content of about 15%.

| | |
|---|---|
| Methacrylamide | 83 parts |
| 2-Hydroxyethyl methacrylate | 10 parts |
| Methacrylic acid | 5 parts |
| Styrene | 2 parts |
| Deionized water | 200 parts |

Then, 100 parts of deionized water for solid content adjustment was added to 530 parts of an aqueous solution of copolymer resin produced, and while conducting nitrogen replacement again, the temperature was increased to 75° C. Then, 0.5 parts of 4,4'-azobis(4-cyanovaleric acid) was added, and an emulsion of the following composition (mixture of second monomer component, water, and emulsifier) was added continuously for 4 hours, and the mixture was further allowed to stand at the temperature (75° C.) for 3 hours, thereby completing polymerization.

| | |
|---|---|
| Acrylonitrile | 60 parts |
| Butyl acrylate | 35 parts |
| 2-Hydroxyethyl methacrylate | 5 parts |
| Sodium dodecylbenzene sulphonate | 0.1 parts |
| Deionized water | 40.0 parts |

Thereafter, the temperature was cooled to 40° C. or less, and ammonia water was added for alkalization. The mixture was not allowed to stand at 40° C. or more. The aqueous dispersion resin composition having a pH adjusted to about 9.0 and having a solid content of about 23% was produced in this manner.

Comparative Example 3

A separable flask equipped with a mixer and a reflux condenser was charged with 300 parts of deionized water, and 0.5 parts of sodium dodecyl sulfate, and after nitrogen gas replacement, the temperature was increased to 75° C. Then, 0.5 parts of potassium persulfate was added, and an emulsion of the following composition (mixture of second monomer component, water, and emulsifier) was added continuously for about 4 hours. Thereafter, the mixture was aged at 75° C. for 2 hours, thereby completing polymerization.

| Acrylonitrile | 45 parts |
|---|---|
| Butyl acrylate | 25 parts |
| Methyl methacrylate | 15 parts |
| Methacrylic acid | 10 parts |
| Styrene | 5 parts |
| Sodium dodecyl sulfate | 0.3 parts |
| Deionized water | 80 parts |

Thereafter, ammonia water was further added for alkalization, and the temperature (75° C.) was kept for further 3 hours, thereby giving swelling and softening treatment. Thereafter, the temperature was cooled to room temperature, thereby producing an aqueous dispersion resin composition having a pH adjusted to about 8.0 and having a solid content of about 18%.

Comparative Example 4

An aqueous dispersion resin composition was produced in the same manner as in Example 1, except that after ammonia water was added for alkalization, the mixture was not allowed to stand at the temperature.
<Thermal Recording Material>

Example 4

To 100 parts of the aqueous dispersion resin composition (solid content about 20%) produced in Example 1, 86 parts of deionized water was added for dilution, and then 6.2 parts of 65% clay slurry dispersed as a filler in advance (manufactured by Engelhard Corporation, UW-90) (solid content based, 20 mass % relative to solid content in aqueous dispersion resin composition), 5 parts of a polyolefin copolymer emulsion with 40% solid content concentration (manufactured by Mitsui Chemicals, Inc., CHEMIPEARL W400) (solid content based, 10 mass % relative to the solid content in the aqueous dispersion resin composition), and 9.2 parts of 13% aqueous solution of an ammonium zirconium carbonate as a cross-linking agent (manufactured by DAIICHI KIGENSO KAGAKU KOGYO CO., LTD., Zircosol AC-7) (solid content based, 6 mass % relative to solid content in aqueous dispersion resin composition) were mixed homogeneously.

Thereafter, the mixture was applied to a commercially available thermal word processing paper with no surface treatment in a dried mass of 3 g/m$^2$ with a bar coater, and thereafter dried (after forcefully drying at 50° C. for 60 seconds, cured at 40° C. for 16 hours), thereby producing a thermal recording material.

Example 5

To 100 parts of the aqueous dispersion resin composition produced in Example 2 (solid content about 25%), 76 parts of deionized water was added for dilution, and 6.2 parts of polyolefin copolymer emulsion with 40% solid content concentration (manufactured by Mitsui Chemicals, Inc., CHEMIPEARL W4005) (solid content based, 5 mass % relative to solid content in aqueous dispersion resin composition), and 19.1 parts of a 13% aqueous solution of ammonium zirconium carbonate as a cross-linking agent (manufactured by DAIICHI KIGENSO KAGAKU KOGYO CO., LTD., Zircosol AC-7) (solid content based, 10 mass % relative to the solid content in the aqueous dispersion resin composition) were mixed homogeneously.

Thereafter, the mixture was applied to a commercially available thermal word processing paper with no surface treatment in a dried mass of 3 g/m$^2$ with a bar coater, and thereafter dried (after forcefully drying at 50° C. for 60 seconds, cured at 40° C. for 16 hours), thereby producing a thermal recording material.

Example 6

To 100 parts of the aqueous dispersion resin composition produced in Example 3 (solid content about 25%), 94 parts of deionized water was added for dilution, and then as a filler, 8.4 parts of 60% calcium carbonate slurry (manufactured by OKUTAMA KOGYO CO., LTD., Tama Pearl TP-123CS) (solid content based, 20 mass % relative to solid content in aqueous dispersion resin composition), 6.3 parts of polyolefin copolymer emulsion with 40% solid content concentration (manufactured by Mitsui Chemicals, Inc., CHEMIPEARL W401) (solid content based, 5 mass % relative to solid content in aqueous dispersion resin composition), and 6 parts of a 25% aqueous solution of polyamide epichlorohydrin modified product as a cross-linking agent (manufactured by SEIKO PMC CORPORATION, WS4024) (solid content based, 6 mass % relative to solid content in aqueous dispersion resin composition) were mixed homogeneously.

Thereafter, the mixture was applied to a commercially available thermal word processing paper with no surface treatment in a dried mass of 3 g/m$^2$ with a bar coater, and thereafter dried (after forcefully drying at 50° C. for 60 seconds, cured at 40° C. for 16 hours), thereby producing a thermal recording material.

Comparative Example 5

To 100 parts of the aqueous dispersion resin composition produced in Comparative Example 1 (solid content about 20%), 66 parts of deionized water was added for dilution, and then 5.5 parts of a zinc stearate dispersion liquid having a solid content concentration of 36% (manufactured by CHUKYO YUSHI CO., LTD., Z-8-36) (solid content based, 5 mass % relative to solid content in aqueous dispersion resin composition), and 2.4 parts of a 25% aqueous solution of polyamide epichlorohydrin modified product as a cross-linking agent (manufactured by SEIKO PMC CORPORATION, WS4027) (solid content based, 3 mass % relative to solid content in aqueous dispersion resin composition) were mixed homogeneously.

Thereafter, the mixture was applied to a commercially available thermal word processing paper with no surface treatment in a dried mass of 3 g/m$^2$ with a bar coater, and thereafter dried (after forcefully drying at 50° C. for 60 seconds, cured at 40° C. for 16 hours), thereby producing a thermal recording material.

Comparative Example 6

To 100 parts of aqueous dispersion resin composition produced in Comparative Example 2 (solid content about 23%), 74 parts of deionized water was added for dilution, and 7 parts of 65% clay slurry dispersed as a filler in advance (manufactured by Engelhard Corporation, UW-90) (solid content based, 20 mass % relative to solid content in aqueous dispersion resin composition), 5.8 parts of polyolefin copolymer emulsion with 40% solid content concentration (manufactured by Mitsui Chemicals, Inc., CHEMIPEARL W400) (solid content based, 10 mass % relative to the solid content in the aqueous dispersion resin composition), and 5.5 parts of a 25% aqueous solution of polyamide epichlorohydrin modified product as a cross-linking agent (manufactured by SEIKO PMC CORPORATION, WS4024)

(solid content based, 6 mass % relative to solid content in aqueous dispersion resin composition) were mixed homogeneously.

Thereafter, the mixture was applied to a commercially available thermal word processing paper with no surface treatment in a dried mass of 3 g/m² with a bar coater, and thereafter dried (after forcefully drying at 50° C. for 60 seconds, cured at 40° C. for 16 hours), thereby producing a thermal recording material.

Comparative Example 7

To 100 parts of the aqueous dispersion resin composition produced in Comparative Example 3 (solid content about 18%), 33.5 parts of deionized water was added for dilution. Then, 5.5 parts of 65% clay slurry dispersed as a filler in advance (manufactured by Engelhard Corporation, UW-90) (solid content based, 20 mass % relative to solid content in aqueous dispersion resin composition), and 4.5 parts of polyolefin copolymer emulsion with 40% solid content concentration (manufactured by Mitsui Chemicals, Inc., CHEMIPEARL W400) (solid content based, 10 mass % relative to the solid content in the aqueous dispersion resin composition) were mixed homogeneously.

Thereafter, the mixture was applied to a commercially available thermal word processing paper with no surface treatment in a dried mass of 3 g/m² with a bar coater, and thereafter dried (after forcefully drying at 50° C. for 60 seconds, cured at 40° C. for 16 hours), thereby producing a thermal recording material.

Example 7

A thermal recording material was produced in the same manner as in Example 4, except that the dispersion resin composition produced in Example 2 was used, and its solid content was based.

Comparative Example 8

A thermal recording material was produced in the same manner as in Example 4, except that the dispersion resin composition produced in Comparative Example 1 was used, and its solid content was based.

Comparative Example 9

A thermal recording material was produced in the same manner as in Example 4, except that the dispersion resin composition produced in Comparative Example 2 was used, and its solid content was based.

Comparative Example 10

A thermal recording material was produced in the same manner as in Example 4, except that the dispersion resin composition produced in Comparative Example 3 was used, and its solid content was based.

Comparative Example 11

A thermal recording material was produced in the same manner as in Example 4, except that the dispersion resin composition produced in Comparative Example 4 was used, and its solid content was based.

Comparative Example 12

A thermal recording material was produced in the same manner as in Example 3, except that the dispersion resin composition produced in Comparative Example 1 was used, and its solid content was based.

Comparative Example 13

A thermal recording material was produced in the same manner as in Example 3, except that the dispersion resin composition produced in Comparative Example 2 was used, and its solid content was based.

Evaluation Method

The aqueous dispersion resin composition and thermal recording material produced in Examples and Comparative Examples are evaluated with the following method. The results are shown in Tables 1 to 4.

Table 2 shows the results of Examples 4 to 6 and Comparative Examples 5 to 7.

Table 3 shows the results of Example 7 and Comparative Examples 8 to 11, and Table 3 also shows the results of Example 4, which has the same production method of the thermal recording material.

Table 4 shows Comparative Examples 12 to 13, and also shows the results of Example 6 which has the same production method of the thermal recording material.

<Spinnability>

Using an extensional rheometer (manufactured by Thermo Fisher Scientific Inc., CaBER1), an aqueous dispersion resin composition with its solid content adjusted so that B type viscosity (60 revolution) was about 250 mPa·s was sealed between circular plates with a diameter of 4 mm (gap 2 mm); the upper plate was pulled up by 6 mm with a speed of 300 mm/s and kept, and the time from the start of the pulling up of the plate until the polymer filament undergoes breaking was measured.

<Running Stability>

For the thermal recording material, using a thermal printer (manufactured by Ohkura Electric Co., Ltd.: TH-PMX), a pattern image of solid black print was made with the following conditions, and the degree of the sound (cracking sound) at that time and smudges on the head were evaluated comprehensively.

Applied voltage 23 V
Pulse width 0.8 ms
Applied energy 0.54 mJ/dot

Evaluation criteria are shown below.

Good: Small printing sound at the time of printing, and no smudge is on the printing head.

Average: Slightly loud printing sound at the time of printing, but no smudge on the printing head, and practically no problem.

Bad: Smudge is on the printing head, and protection layer came off on the printed surface.

<Plasticizer Resistance>

For the thermal recording material, the image was made in the same manner as described above, and a transparent polyvinyl chloride adhesive tape (manufactured by NITTO DENKO CORPORATION) was stuck on the image portion, and removed after leaving it at 40° C. for 72 hours. The concentration before and after sticking the transparent polyvinyl chloride adhesive tape was measured with a Macbeth concentration meter, and retention of the printing concentration was determined.

<Water Resistant Blocking Properties>

A drop of water was applied on the applied surface of the thermal recording material, and the thermal recording materials were placed on top of another so that their applied surface are overlapping, and a load of 100 g/cm² was applied, and left for 24 hours or more under a condition of 40° C./65% RH. Thereafter, the overlapped surfaces were removed and the blocking status was determined. Evaluation criteria are shown below.
Excellent: No blocking at all and easily removed.
Good: With a little resistance at the time of removing, but removed with no problem, and no abnormality was seen on the applied surface.
Average: With a little resistance at the time of removing, and damages are seen on some spots of the applied surface.
Bad: Difficult to remove with strong resistance, and the applied surface were heavily damaged.
<Water Resistance>
The thermal recording material was immersed in water, and after allowing the thermal recording material to stand at 23° C. for 24 hours, removal of the applied surface was visually checked. Evaluation criteria are shown below.

Good: No removal of applied surface was observed.
Average: Slight removal of applied surface, but practically no problem.
Bad: Removal of the applied surface occurred.
<Solvent Resistance>
A line was drawn with an oil-based marker on the applied surface of the thermal recording material, and the degree of color development was visually observed. Evaluation criteria are shown below.
Good: No color development was observed on the thermal recording layer.
Average: Slight color development was observed on the thermal recording layer, but practically no problem.
Bad: Coloring was observed on the thermal recording layer.

TABLE 1

| | No. | | Example 1 | Example 2 | Example 3 | Comparative Example 1 | Comparative Example 2 | Comparative Example 3 | Comparative Example 4 |
|---|---|---|---|---|---|---|---|---|---|
| Mixing formulation | Second polymer (Core) | Acrylonitrile | 55 | 40 | 45 | 55 | 60 | 45 | 55 |
| | | n-Butyl acrylate | 30 | 40 | 40 | 35 | 35 | 25 | 30 |
| | | Methacrylic acid | 10 | 6 | 5 | 1 | — | 10 | 10 |
| | | 2-Hydroxyetlyl methacrylate | — | — | — | 7 | 5 | — | — |
| | | Methacrylamide | — | 10 | — | 2 | — | — | — |
| | | Styrene | — | 4 | — | — | — | 5 | — |
| | | Methyl methacrylate | 5 | — | 10 | — | — | 15 | 5 |
| | First polymer (Shell) | Methacrylamide | 70 | 79.5 | 82.5 | 70 | 83 | — | 70 |
| | | Methacrylic acid | 15 | 10 | 10 | 10 | 5 | — | 15 |
| | | 2-Hydroxyetlyl methacrylate | 15 | 10 | 5 | 20 | 10 | — | 15 |
| | | Styrene | — | — | 2 | — | 2 | — | — |
| | | Sodium methallylsulfonate | — | 0.5 | 0.5 | — | — | — | — |
| | | Core/Shell ratio | 1/0.2 | 1/0.2 | 1/0.4 | 1/0.5 | 1/0.8 | — | 1/0.2 |
| | | Swelling and softening treatment | Yes | Yes | Yes | No | No | Yes | No |
| Aqueous dispersion resin composition | | Solid content [%] | 20 | 25 | 25 | 20 | 23 | 18 | 20 |
| | | Viscosity [mPa · s] | 1450 | 1500 | 250 | 800 | 900 | 700 | 250 |
| | | pH[—] | 8.0 | 7.0 | 6.0 | 9.0 | 9.0 | 8.0 | 8.0 |
| | | Spinnability(break time) [ms@250 mPa · s] | 51 | 71 | 106 | 22 | 35 | 27 | 17 |

TABLE 2

| | No. | Example 4 | Example 5 | Example 6 | Comparative Example 5 | Comparative Example 6 | Comparative Example 7 |
|---|---|---|---|---|---|---|---|
| | Aqueous dispersion resin composition | Example 1 | Example 2 | Example 3 | Comparative Example 1 | Comparative Example 2 | Comparative Example 3 |
| Thermal recording material | Running stability | Good | Good | Good | Good | Good | Good |
| | Plasticizer resistance | 96% | 92% | 89% | 95% | 93% | 82% |
| | Water resistant blocking properties | Excellent | Good | Good | Average | Bad | Excellent |
| | Water resistance | Good | Good | Good | Average | Good | Good |
| | Solvent resistance | Good | Good | Good | Good | Good | Average |

TABLE 3

| | No. | Example 4 | Example 7 | Comparative Example 8 | Comparative Example 9 | Comparative Example 10 | Comparative Example 11 |
|---|---|---|---|---|---|---|---|
| | Aqueous dispersion resin composition | Example 1 | Example 2 | Comparative Example 1 | Comparative Example 2 | Comparative Example 3 | Comparative Example 4 |
| Thermal recording material | Running stability | Good | Good | Good | Good | Good | Good |
| | Plasticizer resistance | 96% | 98% | 99% | 98% | 87% | 34% |
| | Water resistant blocking properties | Excellent | Good | Bad | Bad | Excellent | Excellent |
| | Water resistance | Good | Good | Bad | Bad | Good | Good |
| | Solvent resistance | Good | Good | Good | Good | Average | Average |

TABLE 4

|  |  | No. | | |
|---|---|---|---|---|
|  |  | Example 6 | Comparative Example 12 | Comparative Example 13 |
| Aqueous dispersion resin composition | | Example 3 | Comparative Example 1 | Comparative Example 2 |
| Thermal recording material | Running stability | Good | Good | Good |
|  | Plasticizer resistance | 89% | 89% | 90% |
|  | Water resistant blocking properties | Good | Average | Bad |
|  | Water resistance | Good | Average | Average |
|  | Solvent resistance | Good | Good | Good |

DESCRIPTION OF REFERENCE NUMERAL 1 thermal recording material
2 support layer
3 thermal recording layer
4 protection layer

The invention claimed is:

1. An aqueous dispersion resin composition comprising:
a first polymer produced by polymerizing a first monomer component containing (meth)acrylamide and a first copolymerizable monomer that is copolymerizable with (meth)acrylamide, and
a second polymer produced by polymerizing a second monomer component containing a carboxy group-containing vinyl monomer and a second copolymerizable monomer that is copolymerizable with carboxy group-containing vinyl monomer, the second polymer being covered with the first polymer, and including core-shell particles consisting of the first polymer and the second polymer,
wherein the carboxy group-containing vinyl monomer content relative to 100 parts by mass of the second monomer component is 4 parts by mass or more and 10 parts by mass or less,
the carboxy group-containing vinyl monomer is methacrylic acid, and,
at least a portion of the carboxy group in the second polymer is neutralized after polymerizing the second monomer component, and then kept for 30 minutes or more.

2. The aqueous dispersion resin composition according to claim 1, wherein the (meth)acrylamide content relative to 100 parts by mass of the first monomer component is 50 parts by mass or more and 100 parts by mass or less.

3. The aqueous dispersion resin composition according to claim 1, wherein the first monomer component further contains a carboxy group-containing vinyl monomer and/or a hydroxyl group-containing vinyl monomer.

4. The aqueous dispersion resin composition according to claim 1, wherein the second monomer component further contains (meth)acrylonitrile, and
the (meth)acrylonitrile content relative to 100 parts by mass of the second monomer component is 15 parts by mass or more and 90 parts by mass or less.

5. The aqueous dispersion resin composition according to claim 1, wherein the first polymer content relative to 100 parts by mass of the second polymer is 5 parts by mass or more and 500 parts by mass or less.

6. The aqueous dispersion resin composition according to claim 1, wherein the carboxylic acid salt formed by neutralizing at least a portion of the carboxy group is ammonium salt.

7. The aqueous dispersion resin composition according to claim 1, wherein the carboxy group in the second polymer is neutralized by adding salt-containing water after polymerizing the second monomer component.

8. The aqueous dispersion resin composition according to claim 1, wherein the first monomer component and/or the second monomer component further contains a sulfonic acid group-containing vinyl monomer and/or its salt.

9. The aqueous dispersion resin composition according to claim 8, wherein when the first monomer component contains the sulfonic acid group-containing vinyl monomer and/or its salt, the content thereof relative to 100 parts by mass of a total of the first monomer component is 0.01 parts by mass or more and 20 parts by mass or less, and
when the second monomer component contains the sulfonic acid group-containing vinyl monomer and/or its salt, the content thereof relative to 100 parts by mass of a total of the second monomer component is 0.01 parts by mass or more and 20 parts by mass or less.

10. A resin composition for a thermal recording layer, wherein the resin composition is used for a thermal recording layer of a thermal recording material comprising a support layer, a thermal recording layer, and a protection layer; and
the resin composition for a thermal recording layer comprises the aqueous dispersion resin composition according to claim 1.

11. A thermal recording material comprising a support layer,
a thermal recording layer laminated on one side in the thickness direction of the support layer, and
a protection layer laminated on one side in the thickness direction of the thermal recording layer,
wherein the thermal recording layer comprises a cured product of the resin composition for a thermal recording layer according to claim 10.

12. The thermal recording material according to claim 11 produced by applying the resin composition for a thermal recording layer to the support layer by curtain coating, curing the resin composition for a thermal recording layer to form the thermal recording layer, and
laminating the protection layer on the thermal recording layer.

13. A resin composition for a protection layer, wherein the resin composition is used for protection layer of a thermal recording material, the thermal recording material comprises a support layer, a thermal recording layer, and a protection layer, and
the resin composition for a protection layer comprises the aqueous dispersion resin composition according to claim 1.

14. A thermal recording material comprising a support layer,
a thermal recording layer laminated on one side in the thickness direction of the support layer, and
a protection layer laminated on one side in the thickness direction of the thermal recording layer,
wherein the protection layer comprises a cured product of the resin composition for a protection layer according to claim 13.

15. The thermal recording material according to claim 14 produced by laminating the thermal recording layer on the support layer,
then applying the resin composition for a protection layer to the thermal recording layer by curtain coating, and curing the resin composition for a protection layer.

* * * * *